Patented Sept. 5, 1939

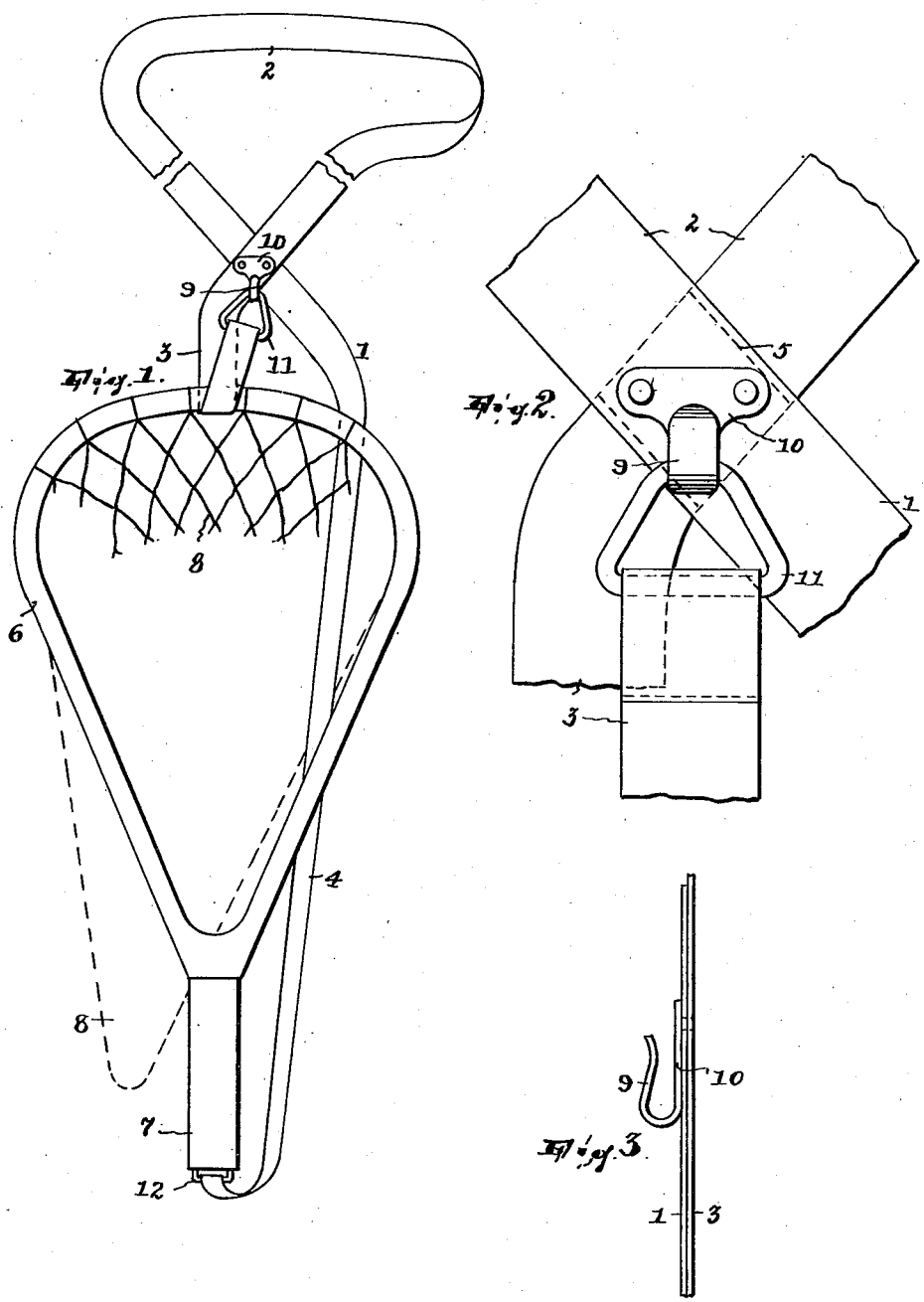

2,172,175

UNITED STATES PATENT OFFICE 2,172,175

FISHING NET EQUIPMENT

Emmet Probst, Mountain View, N. J.

Application July 3, 1939, Serial No. 282,629

5 Claims. (Cl. 43—11)

The usual net equipment used by stream fishermen, especially, comprises a net having means on the handle by which to hang the net on other equipment worn by the user, as his creel strap or his coat or belt, and a safety loop, usually elastic, which extends around some part of the user's body, as over one shoulder and under his arm at the opposite side and is attached to the net handle. When a fish has been netted the loop serves to retain the net captive or attached to the user when he must now devote both hands to detaching the hook from the fish and frequently also in creeling the fish. This equipment has this fault, that if an open hook is used for hanging the net the latter is likely to be unshipped in passing through brush or in crouching near a rock or other obstacle on which the net frame may rest; and if such a hook is not used but the means for hanging the net is of the class requiring special manipulation to detach the net, then the user cannot sit or assume a low crouching position without the net interfering therewith unless he first unships the net. But especially in passing through brush the net proper, which hangs more or less near the ground, is quite likely to catch on twigs and other obstructions, which is not only harmful to the net but makes it necessary for the fisherman frequently to stop to disengage the net.

According to this invention, combined with a net of the class described (by which I mean comprising a frame, having a loop and a handle projecting therefrom, and a net proper supported in and by the loop) there is a harness including net-supporting means detachably engaged with substantially the free end of the loop of the net frame and thus supporting the net in pendant state with its handle end down, instead of reversely, and also including a flexible depending connection connected to the handle and free of the net from the point of such connection with the handle to said end of the loop. Thus the net is so carried in pendant state that the net proper is appreciably elevated from the ground and when the net is unshipped the connection serves, as in the ordinary equipment, to retain the net captive. But preferably the net-supporting means is flexible and if it is also of adequate extent it permits such freedom of motion of the net relatively to the harness as appreciably to reduce the chance of accidental detachment of the net from said supporting means, even where the same includes a hook, for example.

Herein I explain one specific form of my invention, by way of example.

In the drawing:

Fig. 1 is a fragmentary side elevation of the improved equipment, the net being pendant from the harness or in what I term its normal state, and the net proper appearing partly in dotted outline; and Figs. 2 and 3 are respectively a side elevation and an edge elevation of a fragment of the harness, the terminal portion of the extension 3 in Fig. 2 being omitted.

A length 1 of suitable material, preferably an elastic tape, has one extremity thereof bent back and crossing the other extremity so as to form a loop 2 and leave projecting from such loop a relatively short extension 3 and a long extension 4. Where the cross exists the two plies may be permanently secured together, as by stitching 5. The loop may embrace the user's body, extending over one shoulder and under the opposite arm.

The net is of usual construction comprising a frame having a loop 6 and a handle 7 projecting from the loop and a net proper 8 which is supported by and in the loop in the usual manner, or so that strands of the net proper are attached to the loop at intervals of its circumference.

In this example a metal hook device is attached to the length 1, preferably at the crossing thereof, it having a hook proper 9 which is first bent toward and then from the body 10 of said device. The extension 3 has attached to its end a metal eye or loop 11 which is adapted to be caught on said hook, the bend in the hook forming with the body 10 a space through which the eye may only by manual effort pass freely. The extension 4 is attached to the net handle, as by providing the latter with a staple 12 to which the other end of said extension is secured in any way.

In the normal state of the equipment the extension 3 of what forms the harness exists, as shown, extended through the loop of the net frame at its free end and with its eye 11 caught on the hook device, wherefore the net is supported in pendant state with its handle end down. The extension 4 is free of the net except at its mentioned point of connection with its handle, and it is of such adequate length that the net hangs free thereof or perfectly pendant. When the net is detached from the hook device the extension 4 serves as connection by which the net is kept captive whenever the fisherman allows the net to fall, whereby it may trail handle end forward or as usual.

Having thus fully described my invention, what I claim is:

1. In combination, a net of the class described having a handle, and a harness to be attached to the user and including net supporting means detachably engaged with substantially the free end of the loop of the net frame and thus supporting the net in pendant state with its handle end down and also including a flexible depending connection connected to the handle and free of the net from the point of such connection with the handle to said end of the loop.

2. In combination, a net of the class described having a handle, and a harness to be attached to the user and including flexible net supporting means detachably engaged with substantially the free end of the loop of the net frame and thus supporting the net in pendant state with its handle end down and also including a flexible depending connection connected to the handle and free of the net from the point of such connection with the handle to said end of the loop.

3. In combination, a net of the class described having a handle, and a harness to be attached to the user and including, with a flexible extension protruding through the loop of the net frame at the free end of the loop and being thereupon returned and detachably attached to said harness, said extention thus supporting the net in pendant state with its handle down, a flexible depending connection connected to the handle and free of the net from the point of such connection with the handle to said end of the loop.

4. A net-supporting harness consisting of a flexible length having one extremity crossing the other short of but near the end of the latter and thus forming a loop to embrace a part of the user's body, said extremities being secured together at the crossing and the former extremity being adapted to be passed through the loop of the net frame and thereupon returned and detachably attached to said length and the latter extremity being adapted to be connected to the free end of the net handle.

5. A net-supporting harness including a flexible elongated portion to embrace a part of the user's torso and having flexible extensions one of which is longer than the other, the latter extension being adapted to be passed through the loop of the net frame and thereupon returned and attached to a part of the harness and the longer extension being adapted to be connected to the free end of the net handle.

EMMET PROBST.